United States Patent [19]
Shuen

[11] Patent Number: 6,123,491
[45] Date of Patent: Sep. 26, 2000

[54] CONNECTING SEAT FOR TYING BAR OF CARGO PLATFORM OF SMALL TRUCK

[75] Inventor: Shun-Tian Shuen, San Chung City, Taiwan

[73] Assignee: Janchy Enterprise Co., Ltd., Taipei, Taiwan

[21] Appl. No.: 09/478,088

[22] Filed: Jan. 6, 2000

[51] Int. Cl.[7] .................................................. B60P 7/08
[52] U.S. Cl. ........................ 410/106; 410/110; 410/101
[58] Field of Search .................................. 410/101, 106, 410/110, 116; 296/41, 43; 248/499

[56] References Cited

U.S. PATENT DOCUMENTS

| | | | |
|---|---|---|---|
| 5,618,140 | 4/1997 | Okland | 410/106 |
| 5,873,688 | 2/1999 | Wheatley | 410/106 |
| 5,904,458 | 5/1999 | Bundy | 410/110 X |
| 5,997,227 | 12/1999 | Bundy | 410/106 |

*Primary Examiner*—Stephen T. Gordon
*Attorney, Agent, or Firm*—Bacon & Thomas

[57] ABSTRACT

Connecting seat for tying bar of cargo platform of small truck, including a base seat, a connecting rod and an elongated circular bar. The base seat is mounted on the stopper board and has an insertion section on the surface. Two sides of the insertion section are respectively formed with opposite insertion sockets for different patterns of upper and lower connecting rods to insert therein. One side of the base seat is disposed with two hook sections. The upper connecting rod has a fitting section at one end for fitting with the hollow elongated circular bar. The other end is fixedly inserted into the insertion socket and locked by screws. One end of the lower connecting rod is connected with the upper connecting rod and the other end thereof is also fixedly inserted into the insertion socket and locked by screws. The connecting seat of tying bar is mounted on the stopper board of the cargo platform of a small truck. The loading cargoes are repeatedly tied by the rope or rubber belt which is repeatedly wound on the circular bars and the hook sections to more firmly locate the cargoes so as to ensure safety. The upper and lower connecting rods are independently assembled and can freely cooperate with various patterns so as to vary the pattern of the connecting seat of the tying bar.

1 Claim, 3 Drawing Sheets

CONNECTING SEAT FOR TYING BAR OF CARGO PLATFORM OF SMALL TRUCK

BACKGROUND OF THE INVENTION

The present invention relates to a connecting seat for tying bar of cargo platform of small truck, which is mounted on the stopper board of the cargo platform of the small truck. The loading cargoes are repeatedly tied by the rope or rubber belt which is repeatedly wound on the circular bars and the hook sections to more firmly locate the cargoes so as to ensure safety. The upper and lower connecting rods are independently assembled and can freely cooperate with various patterns to vary the pattern of the connecting seat of the tying bar.

A conventional small truck has a cargo platform. The periphery of the cargo platform is mounted with folding stopper boards. A tying bar is welded on the stopper board to prevent the cargoes from dropping out during transferring. The outer face of each stopper board is disposed with several small-size hook sections. By means of a rope or a rubber belt, the cargo can be repeatedly tied and firmly fixed on the hook sections and the tying bars. In order to ensure that the cargo is firmly tied, the rope or rubber belt is repeatedly hooked on the hook sections and the welded tying bars. However, the hook section is a semicircular structure so that the area allowing the hooked rope or rubber belt is very small and the rope or rubber belt tends to loosen from the hook section. This may lead to an accident. With respect to the welded tying bar, the tying bar cannot be replaced to have different patterns so that the pattern of the connecting seat cannot be varied.

SUMMARY OF THE INVENTION

It is therefore a primary object of the present invention to provide a connecting seat for tying bar of cargo platform of small truck, which is mounted on the stopper board of the cargo platform of the small truck. The loading cargoes are repeatedly tied by the rope or rubber belt which is repeatedly wound on the tying bars so that the cargoes can be firmly located.

It is a further object of the present invention to provide the above connecting seat for tying bar of cargo platform of small truck in which the upper and lower connecting rods are independently conveniently assembled by a user himself and the patterns of the connecting seat can be varied to achieve decorative and beautifying effect for the truck body.

The present invention can be best understood through the following description and accompanying drawings wherein:

DETAILED DESCRIPTION OF THE PREFERRED EMBODIMENT

Figure 1:
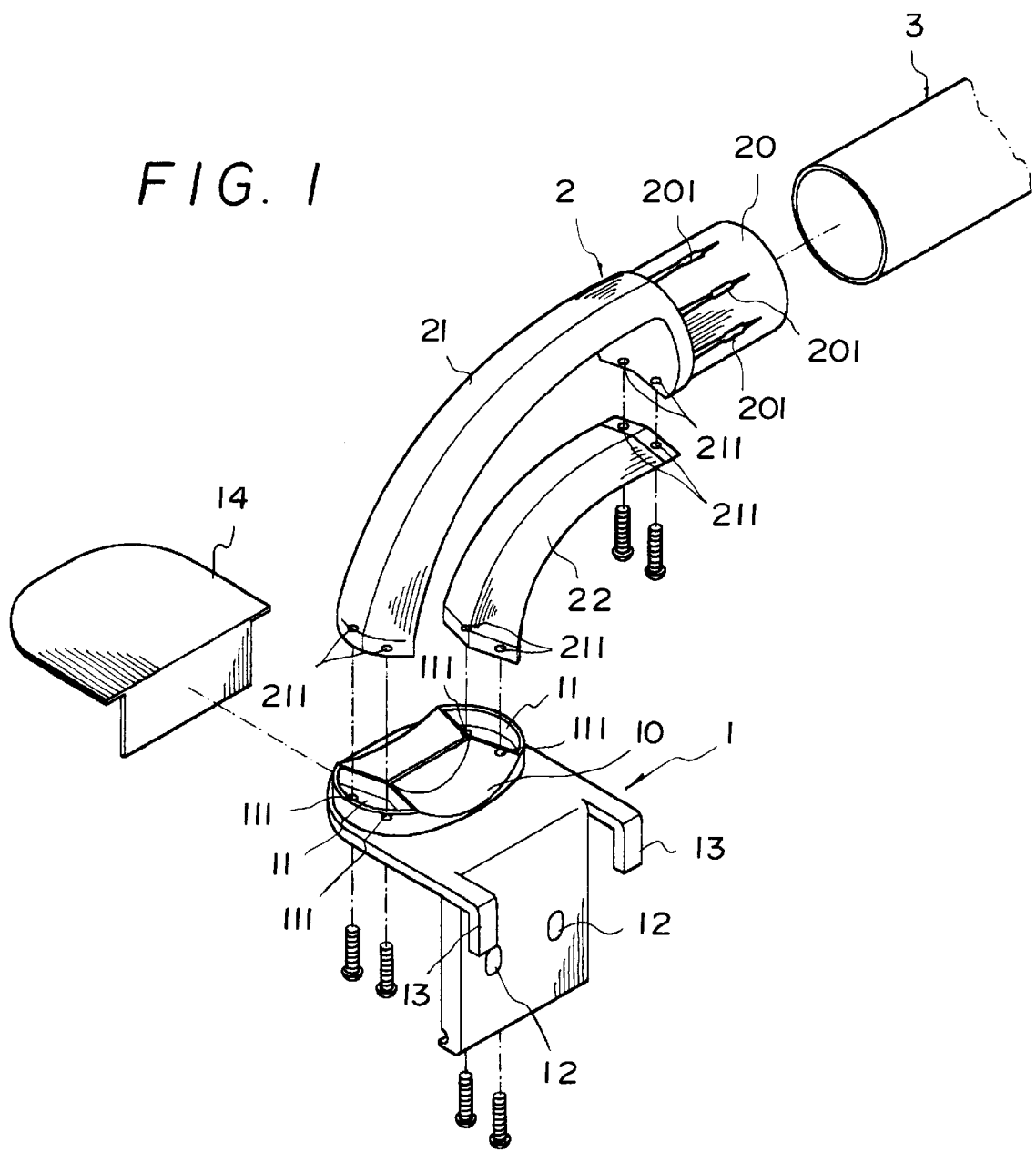
FIG. 1 is a perspective exploded view of the present invention.
Figure 2:
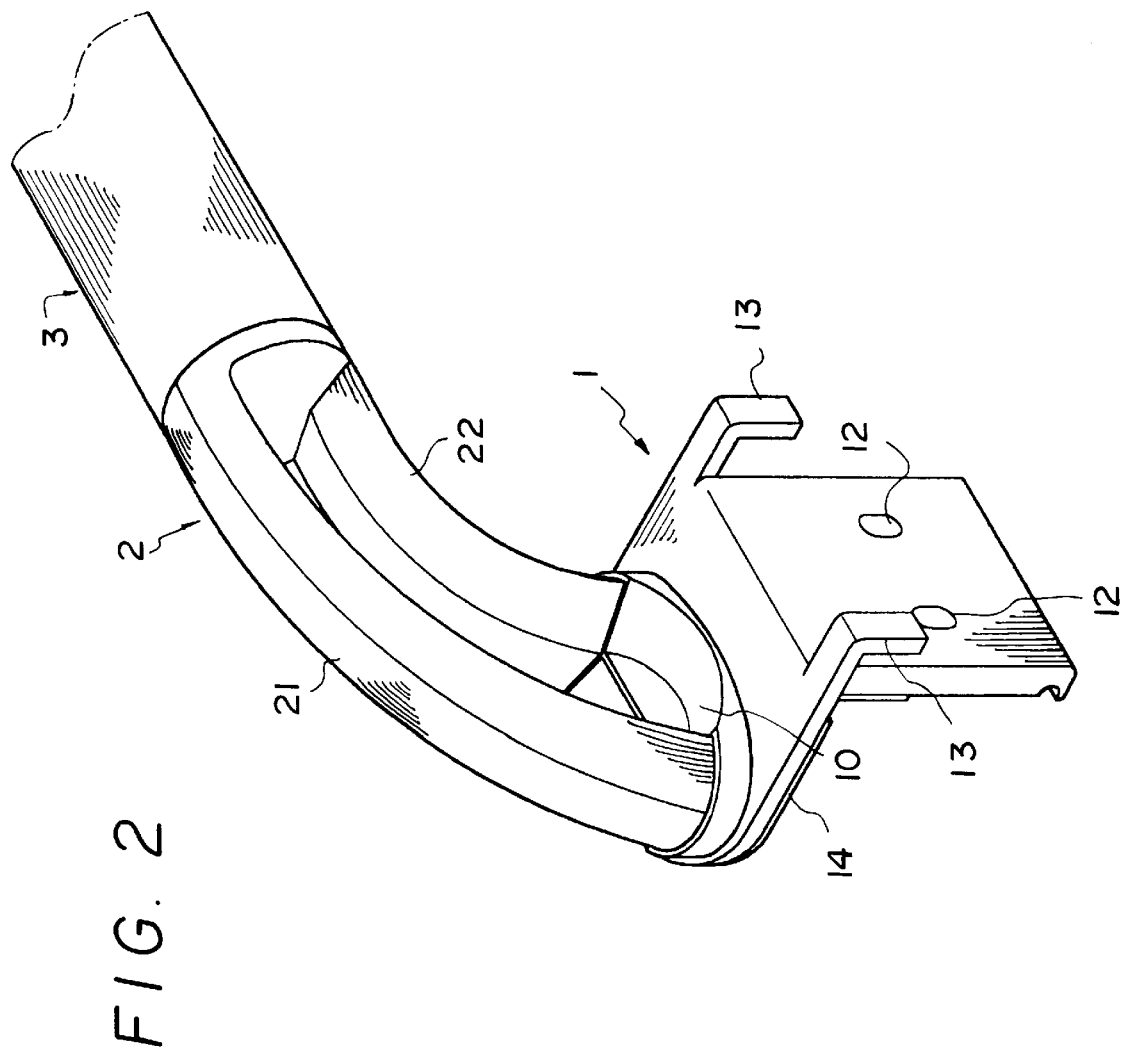
FIG. 2 is a perspective assembled view of the present invention.

Please refer to FIGS. 1 and 2. The present invention is composed of a base seat 1, a connecting rod 2 and an elongated circular bar 3.

The base seat 1 is L-shaped and has an insertion section 10 on the surface. Two sides of the insertion section 10 are respectively formed with opposite insertion sockets 11 for the connecting rod 2 to insert therein. A through hole 111 is formed in the insertion socket 11. One side of the base seat 1 is formed with perforations 12 for connecting with the stopper board of the cargo platform. The base seat 1 further has two integrally formed hook sections 13. A soft pad 14 is disposed on bottom face of the base seat 1.

The connecting rod 2 is arched, including an upper connecting rod 21 having a fitting section 20 at one end. The circumference of the fitting section 20 is formed with several protuberances 201 for tightening the fitting section. The other end of the upper connecting rod is formed with circular holes 211. Two ends of the lower connecting rod 22 are formed with circular holes 211.

The elongated circular bar 3 is a hollow metal bar. Two ends of the circular bar 3 are fitted with the fitting sections 20 of two connecting rods 21.

When assembled, the upper and lower connecting rods 21, 22 are inserted in the insertion sockets 11 of the insertion section 10 of the base seat 1 with the circular holes 211 aligned with the through holes 111. Then screws are passed therethrough to lock the connecting rods with the base seat. Then the fitting section 20 of the other end of the upper connecting rod 21 is fitted with the hollow elongated circular bar 3 and tightened by the protuberances 201 on the circumference thereof so that the fitting section is firmly connected with the circular bar. In addition, the circular holes 211 of the other end of the lower connecting rod 22 are screwed with the circular holes 211 of the upper connecting rod 21.

Figure 3:
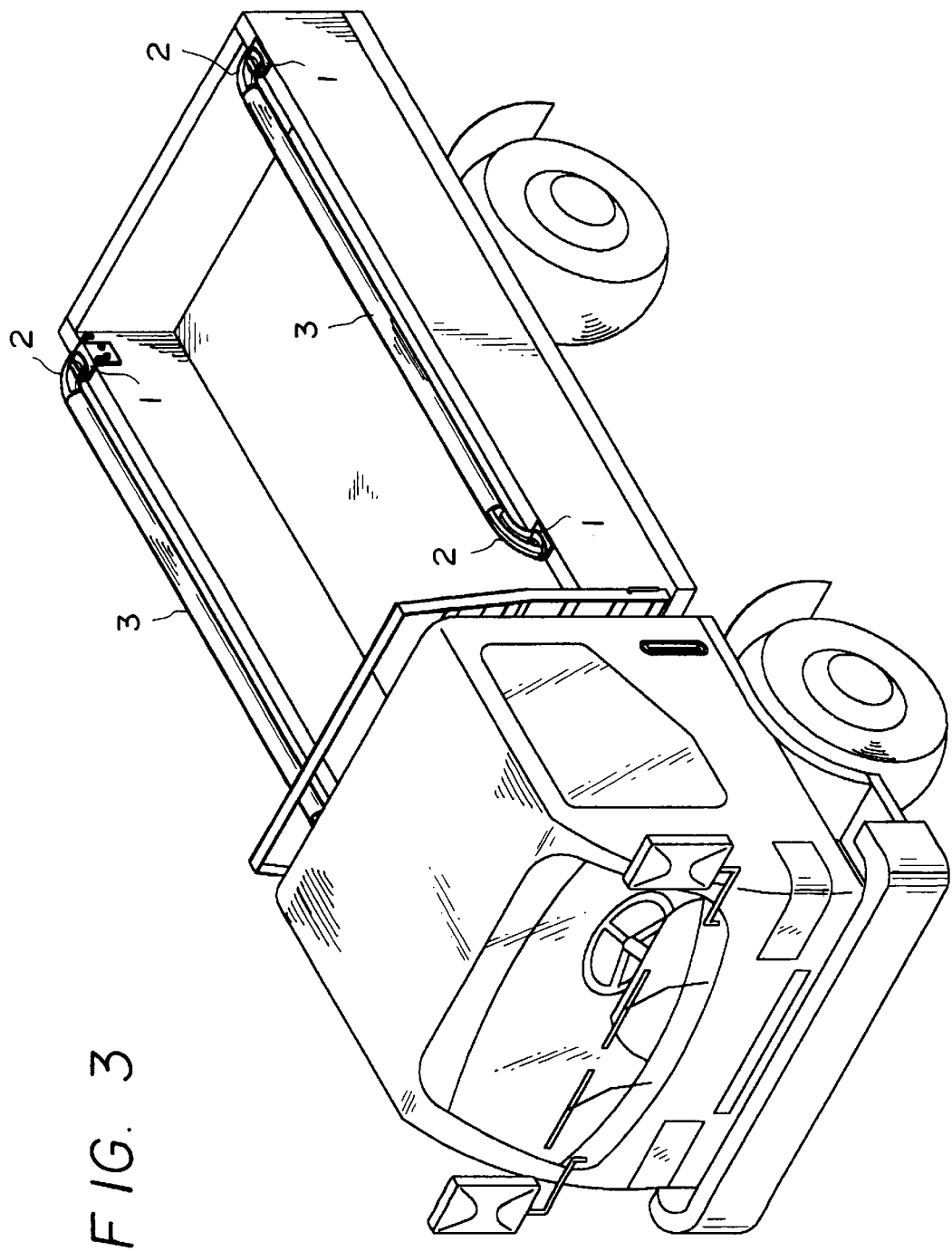
FIG. 3 shows the application of the present invention to the stopper boards of a small truck.

In use, the assembled connecting seat is mounted on the stopper board of the cargo platform of the small truck and screws are passed through the perforations 12 of one side of the base seat 1 to lock the base seat on the stopper board as shown in FIG. 3. Accordingly, when placing cargoes on the cargo platform of the small truck, a rope or a rubber belt can be used to tie up the cargoes and wound around the elongated circular bar 3 and hooked on the hook sections 13 of the base seat 1. Therefore, the cargoes can be firmly fixed on the cargo platform without freely moving so that the safety can be ensured.

The connecting seat of tying bar of the present invention can be mounted on the stopper board of the cargo platform of a small truck by a user himself. The upper and lower connecting rods 21, 22 can freely cooperate with various patterns to achieve a decorative effect. More importantly, when the loading cargoes can be repeatedly tied by the rope or rubber belt which is repeatedly wound on the circular bars 3 and the hook sections 13 to more firmly locate the cargoes.

The above embodiment is only used to illustrate the present invention, not intended to limit the scope thereof. Many modifications of the above embodiment can be made without departing from the spirit of the present invention.

What is claimed is:

1. A tie bar for a cargo platform of a small truck, comprising:

a base seat which is L-shaped and has an insertion section on a surface thereof, two sides of the insertion section being respectively formed with opposite insertion sockets with a connecting rod inserted therein, a through hole being formed in each insertion socket, one side of the base seat being formed with perforations and disposed with two integrally formed hook sections, a soft pad being disposed on a bottom face of the base seat;

said connecting rod being arched and including an upper connecting rod having a fitting section at one end, a circumference of the fitting section being formed with several protuberances, another end of the upper connecting rod being formed with circular holes, a lower connecting rod attached to the upper connecting rod and including two ends formed with circular holes; and an elongated circular bar which is a hollow metal bar, at least one end of the circular bar being fitted with the fitting section of the upper connecting rod, said tie bar being characterized in that the upper and lower connecting rods are independently connected and can provide a safe and decorative connecting seat for a tie bar of a cargo platform of a small truck.

* * * * *